US012737345B2

(12) United States Patent
Wang et al.

(10) Patent No.: US 12,737,345 B2
(45) Date of Patent: Sep. 15, 2026

(54) QUANTIZATION ERROR COMPENSATION FOR VECTOR COMPUTING

(71) Applicant: Macronix International Co., Ltd., Hsinchu (TW)

(72) Inventors: Huai-Mu Wang, New Taipei (TW); Han-Wen Hu, Zhubei (TW); Bo-Rong Lin, Taichung (TW)

(73) Assignee: Macronix International Co., Ltd., Hsinchu (TW)

( * ) Notice: Subject to any disclaimer, the term of this patent is extended or adjusted under 35 U.S.C. 154(b) by 261 days.

(21) Appl. No.: 18/583,216

(22) Filed: Feb. 21, 2024

(65) Prior Publication Data

US 2025/0265239 A1 Aug. 21, 2025

(51) Int. Cl.

*G06F 16/23* (2019.01)
*G06F 16/22* (2019.01)
*G06F 16/9535* (2019.01)

(52) U.S. Cl.

CPC ...... *G06F 16/2365* (2019.01); *G06F 16/2237* (2019.01); *G06F 16/9535* (2019.01)

(58) Field of Classification Search

CPC ............. G06F 16/2365; G06F 16/2237; G06F 16/9535

See application file for complete search history.

(56) References Cited

U.S. PATENT DOCUMENTS

2015/0169644 A1* 6/2015 Gong .................... G06F 16/532 707/769
2018/0144024 A1 5/2018 Fu et al.
2019/0122081 A1 4/2019 Shin et al.
2019/0347256 A1* 11/2019 Wu ..................... G06F 16/2462
2020/0183964 A1* 6/2020 Wu ........................ G06N 20/00
2021/0133626 A1 5/2021 Seok
2022/0019441 A1* 1/2022 Rosing .................. G06F 9/3836
2023/0123756 A1* 4/2023 Sakai ..................... G06N 3/084 706/25
2024/0380580 A1* 11/2024 Wang ..................... G06N 10/60
2025/0225132 A1* 7/2025 Li ......................... G06F 16/285

FOREIGN PATENT DOCUMENTS

TW 202029074 8/2020

* cited by examiner

*Primary Examiner* — Apu M Mofiz
*Assistant Examiner* — Husam Turki Samara
(74) *Attorney, Agent, or Firm* — Fish & Richardson P.C.

(57) ABSTRACT

A method for performing a computing task includes: extracting one or more features from a user content; converting the features to a floating point query vector; quantizing the floating point query vector; obtaining a database vector including one or more floating point feature vectors; determining a compensation vector based on a data distribution of the floating point query vector; quantizing the floating point feature vectors; determining an error function based on a difference between data distributions of i) the quantized query vector compensated with the compensation vector, and ii) the floating point query vector; determining, based on the error function, values of the compensation vector corresponding to the quantized feature vectors; combining the quantized query vectors and the values of the compensation vector to obtain one or more compensated query vectors; and performing the computing task using the compensated query vectors and the quantized feature vectors to obtain an output.

17 Claims, 7 Drawing Sheets

300A

Original floating-point type :

| input | 0.12 | 0.26 | 0.3 |
|---|---|---|---|

301

×

| weight | 0.2 | 0.3 | 0.1 |
|---|---|---|---|

302

=

Result : 0.132

Quantize Level 4bit {0,1}

| input | 2 | 4 | 5 |
|---|---|---|---|
| weight | 3 | 5 | 2 |

303
304

Re-map back to floating-point :

| input | 0.125 | 0.25 | 0.312 |
|---|---|---|---|

305

×

| weight | 0.187 | 0.312 | 0.125 |
|---|---|---|---|

306

=

Result : 0.140 + delta error : -0.008

300B

| input | 0.12 | 0.26 | 0.3 |
|---|---|---|---|

301

×

| weight | 0.2 | 0.3 | 0.1 |
|---|---|---|---|

302

=

Result : 0.132

Quantize Level 4bit {0,1}

| input | 2 | 4 | 5 |
|---|---|---|---|
| weight | 3 | 5 | 2 |

303
304

| input (add compensation) | | |
|---|---|---|
| 0.125 (0.003) | 0.25 (0) | 0.312 (-0.072) |

305'

×

| weight | 0.187 | 0.312 | 0.125 |
|---|---|---|---|

306

=

Result : 0.132

Figure 4:
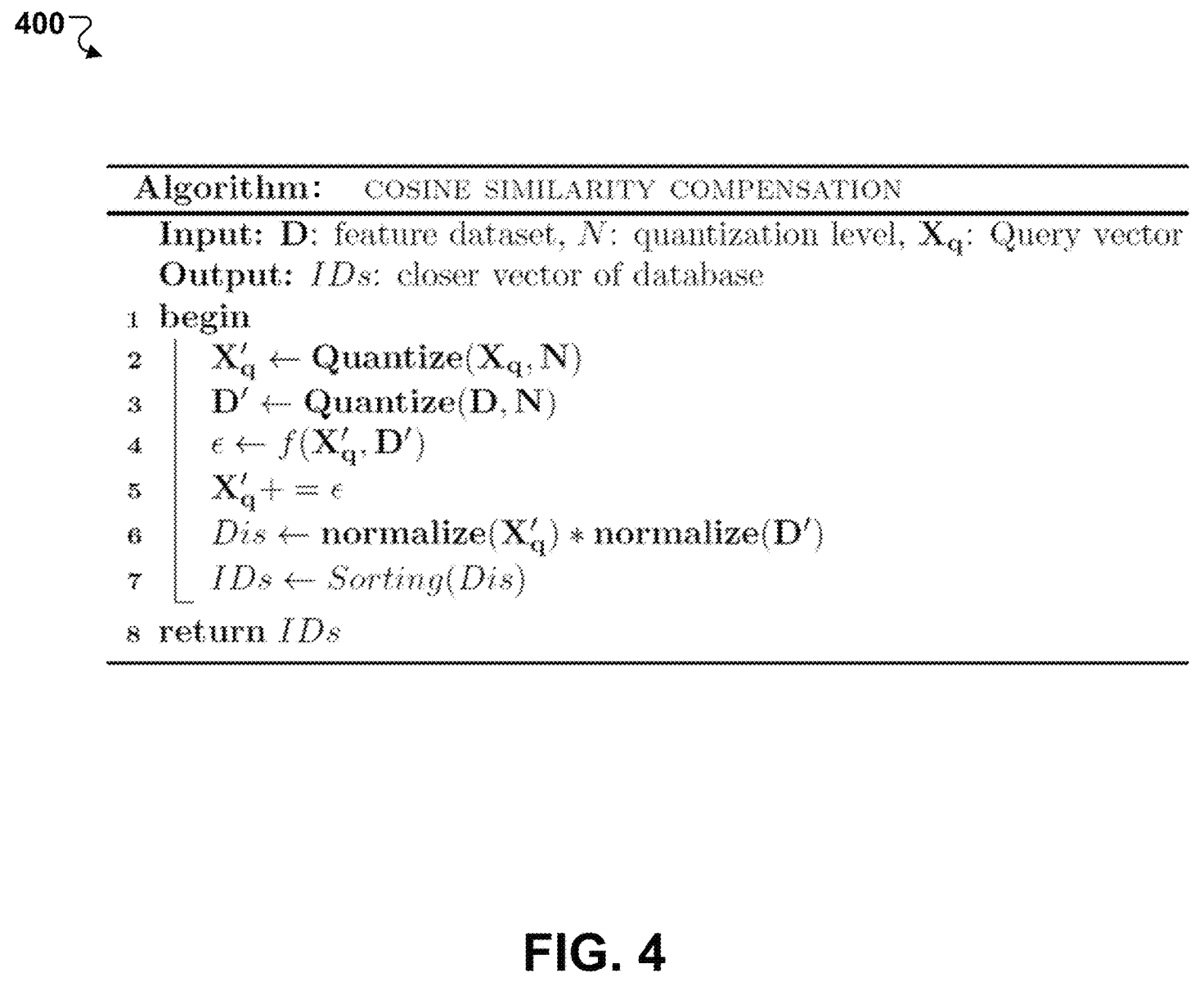

Algorithm: COSINE SIMILARITY COMPENSATION

Input: $\mathbf{D}$: feature dataset, $N$: quantization level, $\mathbf{X_q}$: Query vector

Output: $IDs$: closer vector of database begin

$\mathbf{X'_q} \leftarrow \mathbf{Quantize}(\mathbf{X_q}, \mathbf{N})$ $\mathbf{D'} \leftarrow \mathbf{Quantize}(\mathbf{D}, \mathbf{N})$ $\epsilon \leftarrow f(\mathbf{X'_q}, \mathbf{D'})$ $\mathbf{X'_q} += \epsilon$ $Dis \leftarrow \mathbf{normalize}(\mathbf{X'_q}) * \mathbf{normalize}(\mathbf{D'})$ $IDs \leftarrow Sorting(Dis)$ return $IDs$

QUANTIZATION ERROR COMPENSATION FOR VECTOR COMPUTING

TECHNICAL FIELD

The present disclosure is related to quantization error compensation for vector computing, e.g., in-memory computing (IMC) in semiconductor memory devices.

BACKGROUND

Vector computing technology is used in applications such as artificial intelligence (AI) and machine learning (ML) applications. Vector computing can take place in processors or partially or completely in a memory device. Computing within a memory device is referred to as IMC. Compared to traditional data processing techniques that access data from memory devices and perform computing in a separate circuit, IMC allows the computing to take place within the memory devices, which can increase data processing speed.

SUMMARY

The present disclosure provides techniques relating to quantization error compensation for vector computing. Some semiconductor devices in which the disclosed techniques can be applied include non-volatile memory devices, such as NAND or NOR flash memory devices.

In one aspect, the disclosure describes a method for performing a computing task based on a user content. The method includes extracting one or more features from the user content, the one or more features corresponding to a search request indicated in the user content. The method includes converting the one or more features to a floating point query vector. The method includes quantizing the floating point query vector to obtain a quantized query vector. The method includes obtaining a database vector based on the one or more features, with the database vector including one or more floating point feature vectors. The method includes determining a compensation vector based on a data distribution of the floating point query vector. The method includes quantizing the one or more floating point feature vectors to obtain one or more quantized feature vectors. The method includes determining an error function based on a difference between data distributions of i) the quantized query vector compensated with the compensation vector, and ii) the floating point query vector. The method includes determining, based on the error function, one or more values of the compensation vector corresponding to the one or more quantized feature vectors. The method includes combining the one or more quantized query vectors and the one or more values of the compensation vector to obtain one or more compensated query vectors. The method includes performing the computing task using the one or more compensated query vectors and the one or more quantized feature vectors to obtain an output.

In some implementations, determining the one or more values of the compensation vector comprises: determining the one or more values of the compensation vector such that a difference in magnitude between the quantized query vector compensated with the compensation vector and each of the one or more quantized feature vectors, is below a known threshold value.

In some implementations, the computing task comprises performing at least one of a multiply-and-accumulate operation, general matrix multiplication (GeMM), fully connected layer computing, or k-nearest neighbors computing.

In some implementations, the computing task comprises computing a plurality of vector distances.

In some implementations, the plurality of vector distances comprises at least one of: a plurality of cosine similarity distances, a plurality of Euclidean distances, or a plurality of Hamming distances.

In some implementations, the method includes generating a response to the user content based on the output, wherein generating the response comprises sorting the plurality of vector distances in a descending order or an ascending order.

In some implementations, the user content comprises at least one of: graphical information, textual information, geographical information, or temporal information.

In some implementations, the method includes receiving the user content from at least one of: a text-based search engine, a graph-based search engine, a brute force search engine, or a behavior-based content recommendation system.

In some implementations, performing the computing task comprises performing the computing task using an in-memory computing (IMC) circuit, and wherein the IMC circuit comprises a plurality of memory cells comprising at least one of NAND flash cells, NOR flash cells, phase change memory (PCM), Magnetoresistive random-access memory (MRAM), Ferroelectirc random-access memory (FeRAM), or Spin-Transfer-Torque random-access memory (STT-RAM).

In one aspect, the disclosure describes a computing system having one or more processors and a computing circuit coupled to the one or more processors. The one or more processors are configured to execute instructions to perform operations of the method described above.

In one aspect, the disclosure describes a non-transitory computer-readable medium storing program instructions that, when executed, cause one or more processors to perform operations of the method described above.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 3 illustrates an example of quantization error compensation for a multiply-and-accumulate operation, according to some implementations.

FIG. 4 illustrates pseudo code of an example algorithm for quantization error compensation, according to some implementations.

Figures are not drawn to scale. Like reference numbers refer to like components.

DETAILED DESCRIPTION

Figure 1:
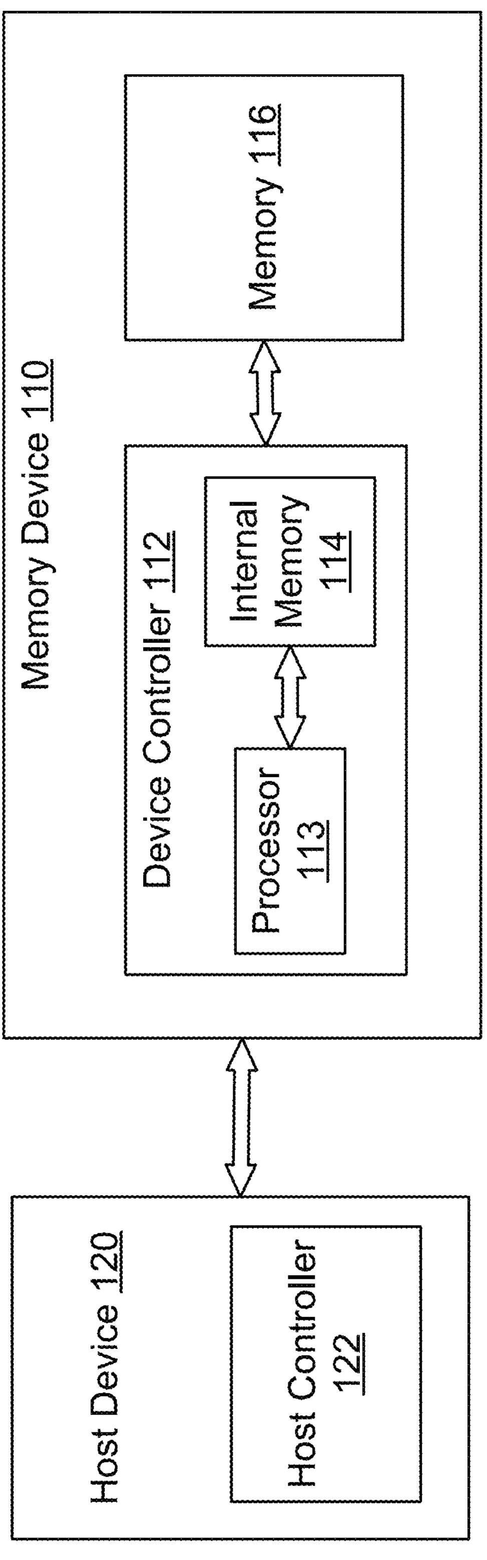
FIG. 1 illustrates a block diagram of an example system including a memory device, according to one or more implementations.

The rise of AI and ML applications is accompanied by increasing needs for large-scale, complex computing capacity. Some AI and ML applications model input data as vectors and use processors and/or memory devices to perform logic or arithmetic computation based on the vectors. For example, a host device, which serves as an edge AI device, can provide vectorized data to a memory device and instruct the memory device to perform certain computations. The memory controller can then provide the vectorized data to the memory cells for computing and return the results back to the host device. By localizing computing tasks within the memory cells, the time for a processor (e.g., the memory controller) to return results can be largely reduced, which can lead to increase in computing efficiency and capacity.

In a more specific example, a host device can execute an AI application to perform a query-based search, e.g., search for a movie. The query can include textual, audio, video, or other types of content obtained from a user of the AI application. The AI application can use numeric formatted vectors to represent features of the query, such as the length, language, and genre of the movie. Upon obtaining the vectors from the AI application, a processor can either use its own computing circuitry or configure the memory cells to perform the computing, such as finding a closest match to the query.

Due to circuit restrictions, e.g., circuit bus bandwidth in terms of bits, floating point data provided by some applications are converted to integer type before being processed. For example, quantization may be performed to convert the floating point data to integer-typed data before processing, and dequantization may be performed to convert the processed data back to floating point. In converting from floating point to integer data, some precision can be lost due to the limitations of the number of bits available to represent digital integer data. Such loss in precision can cause quantization error, due to which the computing result can deviate from a result that would have been obtained if the computation was performed directly using floating point data without quantization. While quantization error can be reduced by introducing more bits to the quantization process to increase precision, the increase of precision can incur more circuit complexity and cost.

Implementations of this disclosure provide techniques that can reduce quantization error without requiring increased precision (e.g., higher number of bits) to represent integer data. As described in detail below, one or more implementations allow for obtaining a compensation vector to be combined with the input data vector after quantization. By compensating the input data vector, the computing circuitry can return results that are closer to the results that would have been returned should the computation be performed using floating point data. Using the results with reduced error, an application can provide the user with more accurate query results, such as a movie that more closely match the user's interest, which can improve the user's experience with the application.

The techniques can be applied to any suitable circuits or devices such as semiconductor devices. For illustration purposes, a memory device is described herein as an example of a semiconductor device. For example, the techniques can be applied to various types of non-volatile memory devices such as NOR flash memory devices, NAND flash memory devices, phase change memory (PCM), erasable programmable read-only memory (EPROM), Static Random Access Memory (SRAM), Resistive Random Access Memory (RRAM), Ferroelectric Random Access Memory (FeRAM), Magnetoresistive Random Access Memory (MRAM), Spin-Transfer-Torque Random Access Memory (STT-RAM) among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), solid-state drives (SSDs), embedded systems, or computing network devices, among others.

FIG. 1 illustrates an example system 100 including a memory device, according to one or more implementations. The system 100 includes a memory device 110 and a host device 120. The memory device 110 includes a device controller 112 and a memory 116. The device controller 112 includes a processor 113 and an internal memory 114. In some implementations, the memory device 110 includes a plurality of memories 116 that are coupled to the device controller 112.

In some implementations, the memory device 110 is a storage device. For example, the memory device 110 can be an embedded multimedia card (eMMC), a secure digital (SD) card, a solid-state drive (SSD), or some other suitable storage. In some implementations, the memory device 110 is a client device that is coupled to a host device 120. For example, the memory device 110 is an SD card in a digital camera or a media player that is the host device 120.

The device controller 112 is a general-purpose microprocessor, or an application-specific microcontroller. In some implementations, the device controller 112 is a memory controller for the memory device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the memory device 110 is an eMMC, an SD card or a smart watch, the internal memory 114 is an SRAM. In some implementations, when the memory device 110 is a digital camera or a media player, the internal memory 114 is DRAM.

In some implementations, the internal memory is a cache memory that is included in the device controller 112, as shown in FIG. 1A. The internal memory 114 stores instruction codes, which correspond to the instructions executed by the processor 113, and/or the data that are requested by the processor 113 during runtime.

The device controller 112 transfers the instruction code and/or the data from the memory 116 to the internal memory 114. The memory 116 can be a semiconductor device. In some implementations, the memory 116 is a non-volatile memory that is configured for long-term storage of instructions and/or data, e.g., a NAND flash memory device, or some other suitable non-volatile memory device. In implementations where the memory 116 is NAND flash memory, the memory device 110 is a flash memory device, e.g., a flash memory card, and the device controller 112 is a NAND flash controller. For example, in some implementations, when the memory device 110 is an eMMC or an SD card, the memory 116 is a NAND flash; in some implementations, when the memory device 110 is a digital camera, the memory 116 is an SD card; and in some implementations, when the memory device 110 is a media player, the memory 116 is a hard disk.

The memory 116 includes a plurality of blocks. The memory 116 can be a two-dimensional (2D) memory including 2D memory blocks. The memory 116 can also be a three-dimensional (3D) memory including 3D memory blocks.

The system 100 can be used for AI applications. For example, the host device 120 can be an edge AI device configured to execute an AI application that involves a computing task. The host device 120 can transmit data used in the computing task to the memory device 110, which is configured to perform IMC in the memory 116. The host device 120 and the memory device 110 can be integrated on the same piece of hardware or distributed across separate pieces of hardware.

Figure 2:
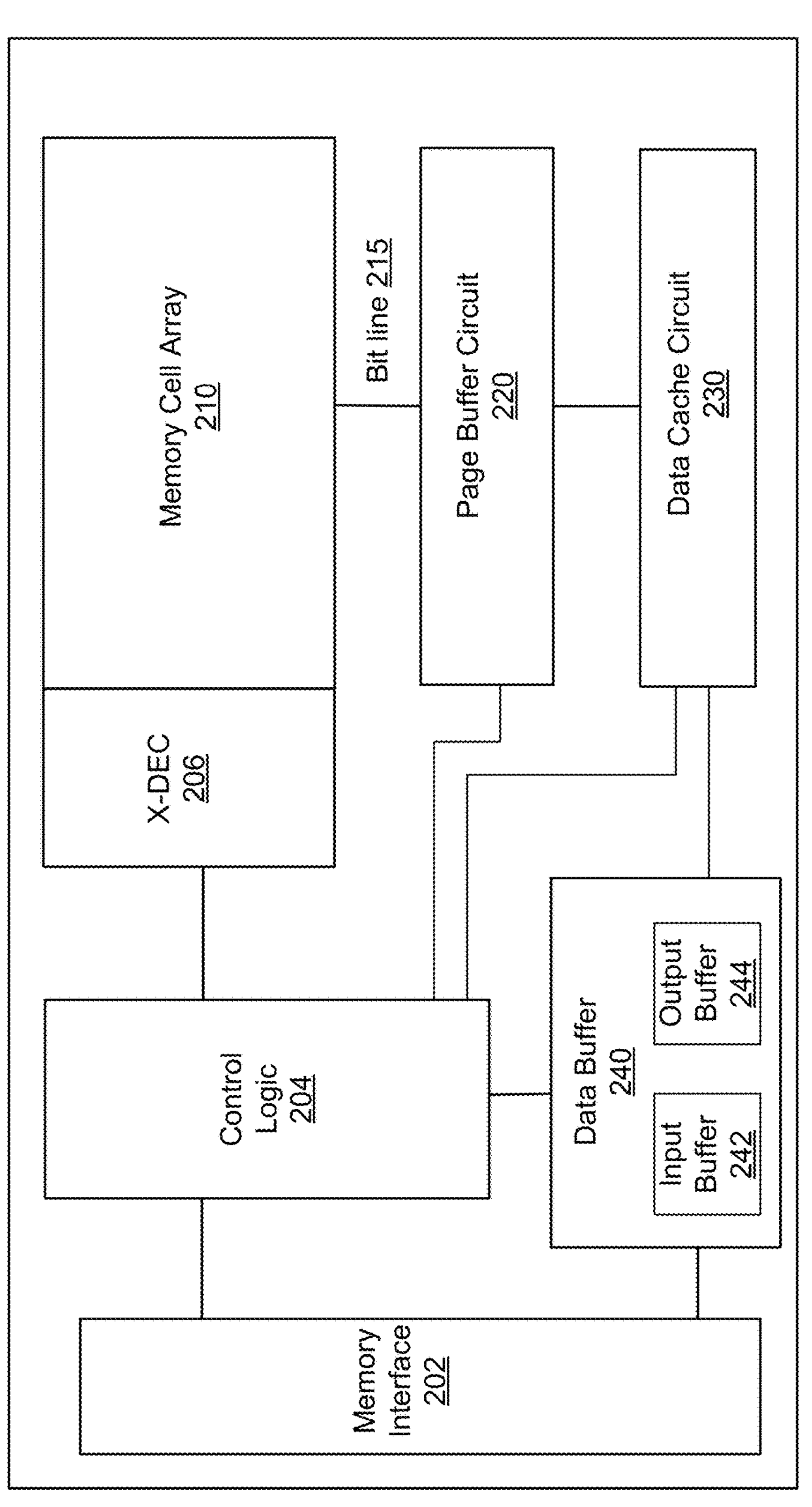
FIG. 2 illustrates a block diagram of an example memory device, according to some implementations.

FIG. 2 illustrates an example memory device 200, according to one or more implementations. The memory device 200 can be implemented as the memory 116 of FIG. 1. The memory device 200 includes a memory cell array 210. The memory cell array 210 can include a number of memory cells coupled in series to a number of row word lines and a number of column bit lines.

A memory cell can include a memory transistor configured as a storage element. The memory transistor can include a silicon-oxide-nitride-oxide-silicon (SONOS) transistor, a floating gate transistor, a nitride read only memory (NROM) transistor, or any suitable non-volatile memory metal-oxide-semiconductor (MOS) device that can store charges.

The memory device 200 includes a memory interface 202 having multiple input/output (I/O) ports for receiving data, e.g., from a controller such as the device controller 112 of FIG. 1 or the host controller 122 of FIG. 1, or outputting data from the memory cell array 210. The memory device 200 includes a data buffer 240 configured to buffer data through the memory interface 202. The data buffer 240 can include a data input buffer 242 configured to buffer/transmit data from a controller (e.g., the device controller 112 of FIG. 1 or the host controller 122 of FIG. 1) through the memory interface 202 to the memory cell array 210. The data buffer 240 can also include a data output buffer 244 configured to buffer/transmit out data from the memory cell array 210 through the memory interface 202, e.g., to a host device such as the host device 120 of FIG. 1.

In some implementations, the memory device 200 further includes an X-decoder (or row decoder) 206 and an optional Y-decoder (not shown). Each memory cell is coupled to the X-decoder 206 via a respective word line and coupled to the Y-decoder via a respective bit line 215. Accordingly, each memory cell can be selected by the X-decoder 206 and the Y-decoder for read or write operations through the respective word line and the respective bit line 215.

The memory device 200 includes a page buffer circuit 220 that includes a number of page buffers. Each page buffer is connected to the memory cell array 210 through a respective bit line 215. In some implementations, a page buffer is connected to the Y-decoder through a data line associated with a corresponding bit line 215 that connects a corresponding line of memory cells in the memory cell array 210. A page buffer is configured to control a voltage on a corresponding bit line to perform an operation, e.g., read, program, or erase, on a memory cell coupled to the corresponding bit line. A page buffer can include at least one latch circuit.

In some implementations, the memory device 200 further includes a data cache circuit 230 coupled between the page buffer circuit 220 and the data buffer 240. During a program or erase operation, the data cache circuit 230 is configured to store data from the data buffer 240 (e.g., from the data input buffer 242) and/or output through the page buffer circuit 220 to the memory cell array 210. During a read operation, the data cache circuit 230 is configured to store data from the memory cell array through the page buffer circuit 220 and/or output data to the data buffer 240 (e.g., to the data output buffer 244).

In some implementations, the memory device 200 further includes a control logic 204 coupled to components in the memory device 200 including the X-decoder 206 and the Y-decoder, the data buffer 240, the page buffer circuit 220, and the data cache circuit 230. The control logic 204 is configured to receive a command, address information, and/or data, e.g., from a memory controller such as the device controller 112 or the host controller 122 of FIG. 1, via the memory interface 202. The control logic 204 can also process the command, the address information, and/or the data, for example, to generate physical address information, e.g., of blocks/pages, in the memory cell array 210. The control logic 204 can include circuitry, e.g., an integrated circuit integrating multiple logics, circuits, and/or components.

In some implementations, the control logic 204 includes a data register, an SRAM buffer, an address generator, a mode logic, and a state machine. The mode logic can be configured to determine whether there is a read or write operation and provide a result of the determination to the state machine.

During a write operation, the data register in the control logic 204 can register input data from the memory interface 202, and the address generator in the control logic 204 can generate corresponding physical addresses to store the input data in specified memory cells of the memory cell array 210. The address generator can be connected the X-decoder 206 and the Y-decoder that are controlled to select the specified memory cells through corresponding word lines and bit lines. The SRAM buffer can retain the input data from the data register in its memory as long as power is being supplied. The state machine can process a write signal from the SRAM buffer and provide a control signal to a voltage generator that can provide a write voltage to the X-decoder 206 and/or the Y-decoder. The Y-decoder is configured to output the write voltage to the bit lines (BLs) for storing the input data in the specified memory cells.

During a read operation, the state machine can provide control signals to the voltage generator and the page buffer circuit 220. The voltage generator can provide a read voltage to the X-decoder 206 and the Y-decoder for selecting a memory cell. A page buffer can sense a small power signal (e.g., a current signal) that represents a data bit ("1" or "0") stored in the selected memory cell through a bit line 215 coupled to the page buffer and the selected memory cell. A sense amplifier can amplify the small power signal swing to recognizable logic levels so the data bit can be interpreted properly by logic inside or outside the memory device 200.

In some implementations, the page buffer circuit 220 and/or the data cache circuit 230 are included in the sense amplifier. The data buffer 240 (e.g., the data output buffer 244) can receive the amplified voltage from the sensor amplifier and output the amplified power signal to the logic outside the memory device 200 through the memory interface 202.

FIG. 3 illustrates an example of quantization error compensation for a multiply-and-accumulate (MAC) operation, according to some implementations. The upper half of FIG. 3 illustrates a MAC operation 300A without compensation, whereas the lower half of FIG. 3 illustrates an MAC operation 300B with compensation.

Both operations 300A and 300B involve an input floating point query vector 301 of (0.12, 0.26, 0.3) and a floating point weight vector (or floating point feature vector) 302 of (0.2, 0.3, 0.1). The task, which can be performed by IMC, is to compute a weighted sum of the elements of the floating point query vector 301 with the weights specified by the floating point weight vector 302. When no error is incurred, the result of the task should be 0.12×0.2+0.26×0.3+0.3×0.1=0.132. However, when quantization is performed, there could be quantization error that lead to a different computing result.

For example, a 4-bit normalized quantization can be performed on the floating point query vector 301 and the floating point weight vector 302. Under such quantization, the range {0, 1} is equally divided into $2^4$=16 regions {0, 1/16}, {1/16, 2/16}, {2/16, 3/16}, . . . {15/16, 1}, which correspond to 16 integers 1, 2, 3, . . . 16, respectively. Because 0.12 falls within the region of {1/16, 2/16}, which corresponds to the integer of 2, 0.12 is quantized to 2. Similarly, 0.26 and 3 are quantized to 4 and 5, respectively. Accordingly, the floating point query vector 301 is quantized to an integer query vector 303 of (2, 4, 5). Likewise, the floating point weight vector 302 is quantized to an integer weight vector 304 of (3, 5, 2).

The integer representation of a floating point vector can lead to quantization error. For example, for an element that equals to 2 in the integer query vector 303, any floating point value within the range of {1/16, 2/16} are represented by the same integer. As such, when the integer representation is remapped to floating point values, the integer 2 may be rounded up to 2/16=0.125, which is the upper boundary of the corresponding range, even though the exact floating point value is 0.12 before quantization. Following similar processes, the integer query vector 303 is remapped to a remapped floating point query vector 305 of (0.125, 0.25, and 0.312), whereas the integer weight vector 304 is remapped to a remapped floating point weight vector 306 of (0.187, 0.312, 0.125). In operation 300A where no compensation is performed, the task using the remapped floating point query vector 305 and the remapped floating point weight vector 306 would return a result of 0.125×0.187+0.25×0.312+0.312×0.125=0.140. An error equal to 0.140-0.132=0.008 has occurred due to quantization.

Different from operation 300A, when a compensation vector & is added to the remapped floating point query vector 305 prior to performing the task, then it is possible to reduce the quantization error. As an example, when ε=(0.003, 0, −0.072) is added to the remapped floating point query vector 305, a resulting compensated floating point query vector 305' would equal (0.128, 0.25, 0.24). Performing the task using the compensated floating point query vector 305' and the remapped floating point weight vector 306 would return a result of 0.128×0.187+0.25×0.312+0.24×0.125=0.132, with significant reduction of the error caused by quantization. Accordingly, by compensation with a carefully selected compensation vector &, the accuracy of computing results can be significantly improved without also requiring that the quantization precision be increased. Furthermore, the compensation vector & can be a trainable or an untrainable compensation vector, which provides flexibility for IMC configuration of the AL/ML application.

FIG. 4 illustrates pseudo code of an example algorithm 400 for quantization error compensation, according to some implementations. The algorithm 400 can be performed by one or more processors, such as the host controller 122 and/or the processor 113 of the system 100.

The algorithm 400 is described in the context of a computing task for determining cosine distances between an input query vector and a plurality of feature vectors so as to find the feature vector that has the highest cosine similarity to the input query vector. The computing task can be performed in part or in whole by the host controller 122, the processor 113, or the memory 116 of the system 100. By finding the feature vector with the highest cosine similarity to the input query, the algorithm 400 can be practically adopted in AI or ML-based applications, such as query-based search (e.g., search for content with features closest to the features included in the query), brute force search (e.g., search for a specified target by exhausting all possibilities), and behavior-based content recommendation (e.g., provide a recommendation that matches a user's interest based on the user's or other users' past behavior). With the adoption of the algorithm 400 or the like in those applications, network techniques such as search engine optimization, route planning, metadata management, and network security can have improved efficiency, accuracy, and data integrity, and business and consumer experience in industries such as e-commerce, social media, and supply chain management can also be similarly improved.

As illustrated in FIG. 4, the algorithm 400 takes as inputs a query vector $X_q$, a database vector D, and a quantization level N. The query vector $X_q$ can be a floating point query vector representing one or more features of an input query, such as a search request, with the features extracted from user content, such as search criteria specified by the user in the search request. The database vector D can include one or more floating point feature vectors determined to be relevant to the features of the query, with each floating point feature vector representing, e.g., a candidate search result or group of search results within a database. The quantization level N can indicate a number of bits in the quantization process, which corresponds to the quantization precision.

Each of the one or more floating point feature vectors in the database vector D can correspond to an identifier (ID), such as an index, and the output of the algorithm 400 is the IDs of the one or more floating point feature vectors closest to the query vector $X_q$, e.g., having the shortest cosine distances from the query vector $X_q$. Put in a query-based search context, the return of the IDs of the closest floating point feature vectors can provide a user with search results that best match the criteria specified in the search request.

The algorithm 400 begins by quantization of the floating point query vector $X_q$ at line 2 and quantization of the one or more floating point feature vectors $D_i$ (i=0, 1, 2 . . . being the index of the floating point feature vector), collectively represented as D, at line 3. Both quantizations have a precision according to the quantization level N. After quantization, the floating point query vector $X_q$ becomes a quantized query vector $$X_q',$$

and the one or more floating point feature vectors become one or more quantized feature vectors $$D_i',$$

collectively represented as D'.

At line 4, the algorithm 400 determines a compensation vector & that minimizes the quantization error, represented as an error function. In some implementations, the error function is represented as a difference between i) a first result of performing the computing task after compensation to the quantized query vector $$X_q',$$

and ii) a second result that ideally would have been returned by the computing task should there be no floating point quantization. Here, the first result can be obtained by performing the computing task using $$(X_q' + \varepsilon) \text{ and } D_i'$$

as inputs, whereas the second result can be obtained by performing the computing task using $X_q$ and $D_i$ as inputs.

In general, the cosine distance between two vectors can be computed by dividing the dot product of the two vectors by the product of the magnitudes of the two vectors. This is equivalent to multiplying the normalizations of the two vectors. Here, the normalization of a vector can be obtained by scaling the vector according to divisor that equals the magnitude of the vector. Accordingly, for each floating point feature vector $D_i$, the first result can be obtained as $$\frac{|(X_q + \varepsilon) \cdot D_{i'}|}{|(X_q + \varepsilon| \cdot |D_{i'}|},$$

and the second result can be obtained as $$\frac{|X_q \cdot D_i|}{|X_q| \cdot |D_i|}.$$

As such, for each floating point feature vector $D_i$, an error function $f$ can be obtained as $$f = \frac{|(X_{q'} + \varepsilon) \cdot D_{i'}|}{|(X_{q'} + \varepsilon| \cdot |D_{i'}|} - \frac{|X_q \cdot D_i|}{|X_q| \cdot |D_i|}.$$

Reducing the magnitude of the error function $f$ can correspond to reducing the computing error due to quantization. Accordingly, at line 4, a processor can be configured to determine a value si of the compensation vector ε such that the magnitude of the error function f is minimized for each floating point feature vector $D_i$. Here, the value $\varepsilon_i$ of the compensation vector ε collectively refers to the numeric values of the elements of the compensation vector ε. In other words, $\varepsilon_i$ can be determined based on $$\text{argmin}_\varepsilon f(\varepsilon) = \text{argmin}_\varepsilon \left( \frac{|(X_{q'} + \varepsilon) \cdot D_{i'}|}{|(X_q' + \varepsilon| \cdot |D_i'|} - \frac{|X_q \cdot D_i|}{|X_q| \cdot |D_i|} \right).$$

In some implementations, the determination of $\varepsilon_i$ is subject to a condition that the quantized query vector $$X_q'$$

after compensation is approximately normalized with the floating point feature vector $$D_i':$$

$$|X_q' + \varepsilon| \approx |D'|.$$

In other words, the value of ε is determined such that a difference between $$|X_q' + \varepsilon| \text{ and } |D'|.$$

is below a threshold value. This condition can be specific to the computing task of determining cosine distances. In other computing tasks, the determination of ¿i can be subject to different conditions.

With the one or more values $\varepsilon_i$ of the compensation vector ε determined, compensation can be made to the quantized query vector $$X_q'$$

at line 5. The compensation can be the sum of the quantized query vector $$X_q'$$

and the compensation vector ε having a value of $\varepsilon_i$.

At line 6 of the algorithm 400, for each index i, the compensated quantized query vector $$X_q'$$

and the corresponding floating point feature vector $D_i$ are provide as inputs to perform the computing task of determining the cosine distance Dis(i). As discussed above, the cosine distance between two vectors can be determined by normalizing the two vectors and obtaining the dot product of the two normalizations.

At line 7, the index i (or multiple indices) corresponding to the smallest cosine distance(s) Dis(i) is identified. This can be achieved by, e.g., sorting all values of Dis(i) in a descending order or an ascending order. At line 8, the identified index i (more multiple indices), or the sorted values of Dis(i), is returned as an output of the computing task. In the example context of a query-based search application, the identified index can be used by the search application to locate the search result that best matches the search criteria specified in the user content.

Although the algorithm 400 described above is for determining cosine distances between a query vector and a plurality of feature vectors, some implementations similar to the algorithm 400 can be adopted to determine other types of vector distances, such as Euclidean distances or Hamming distances. More generally, some implementations similar to the algorithm 400 can be adopted to perform other computing tasks according to the application and the user preference, e.g., the nature of the query or the underlying user content, the type of the input or output data, or available computing resources. The computing tasks can range from basic arithmetic functions, such as addition, subtraction, multiplication, and division, to more complex computing, such as matrix multiplication, fully connected layer computing, or k-nearest neighbors computing. For example, in the operation 300B where the computing task is to find a weighted sum of the floating point query vector 301, an algorithm can be adopted to determine an error function that corresponds to the computing task and to find the compensation vector ε=(0.003, 0, −0.072) based on the error function. The operation 300B can accordingly obtain the compensated floating point query vector 305' and use it to perform the computing task.

Figure 5:
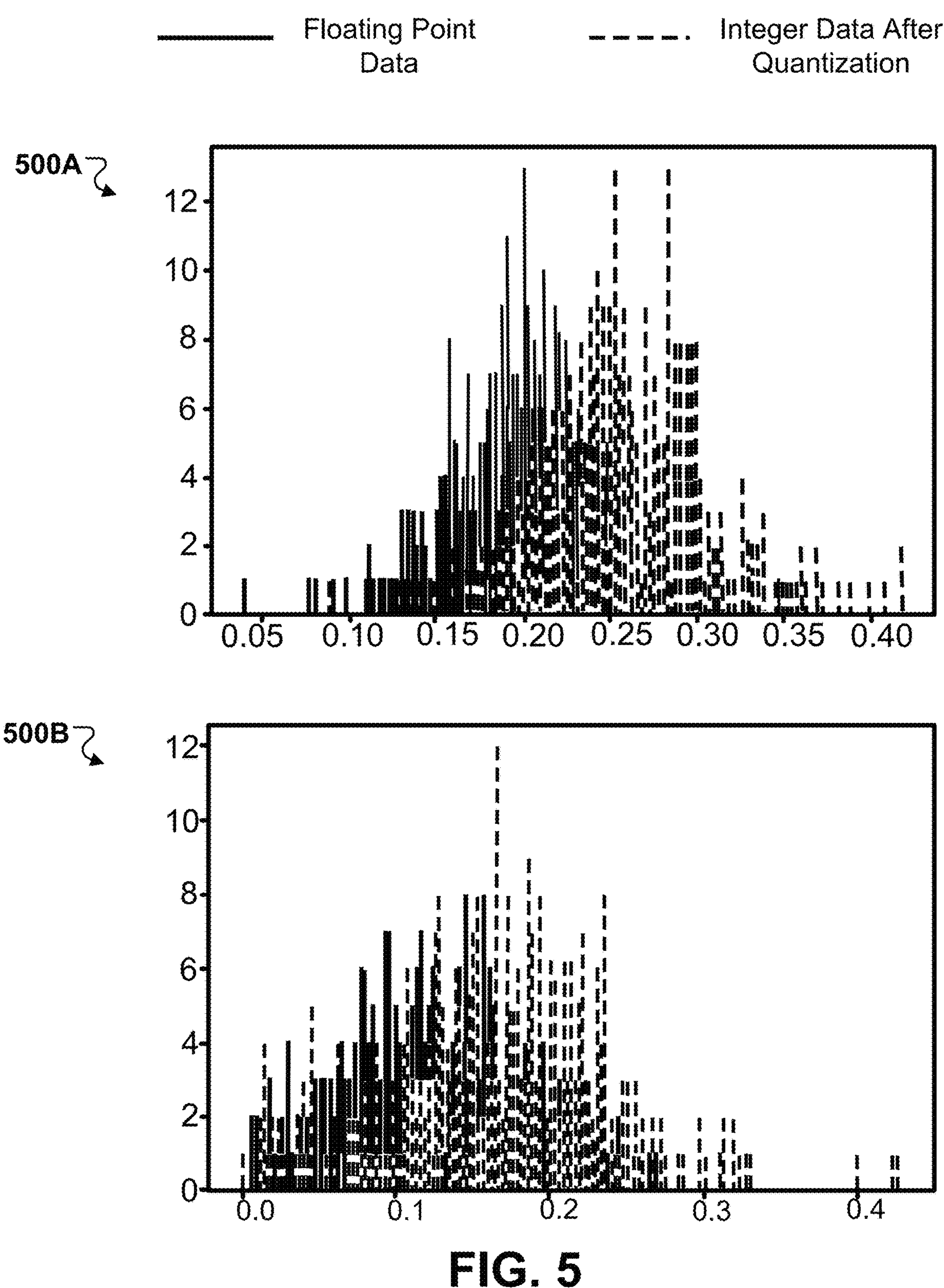
FIG. 5 provides graphical representations comparing quantization error with and without compensation, according to some implementations.

FIG. 5 compares quantization error, e.g., difference between data distributions of a quantized query vector and a floating point query vector, with and without compensation, according to some implementations. The graph 500A illustrates the quantization error without compensation, whereas the graph 500B illustrates the quantization error with compensation according to, e.g., the algorithm 400 or a similar algorithm. In an ideal scenario, the non-quantized data samples and the quantized-dequantized data samples completely overlap, which suggests no quantization error has been introduced. In non-ideal scenarios, however, misalignment between two groups of data samples can be observed. The error function described above with reference to FIG. 4 can be determined based on the difference in data distribution between a compensated quantized query vector and the floating point query vector. By finding the compensation vector with a value that minimizes the magnitude of the error function, algorithms according to the implementations can reduce the quantization error.

Comparing the graphs 500A and 500B, it can be seen that the misalignment between bins representing non-quantized data samples and quantized-dequantized data samples is more visible in the graph 500A than in the graph 500B. This difference visibly shows the improvement to quantization and computing accuracy due to the compensation mechanisms according to some implementations.

Figure 6A:
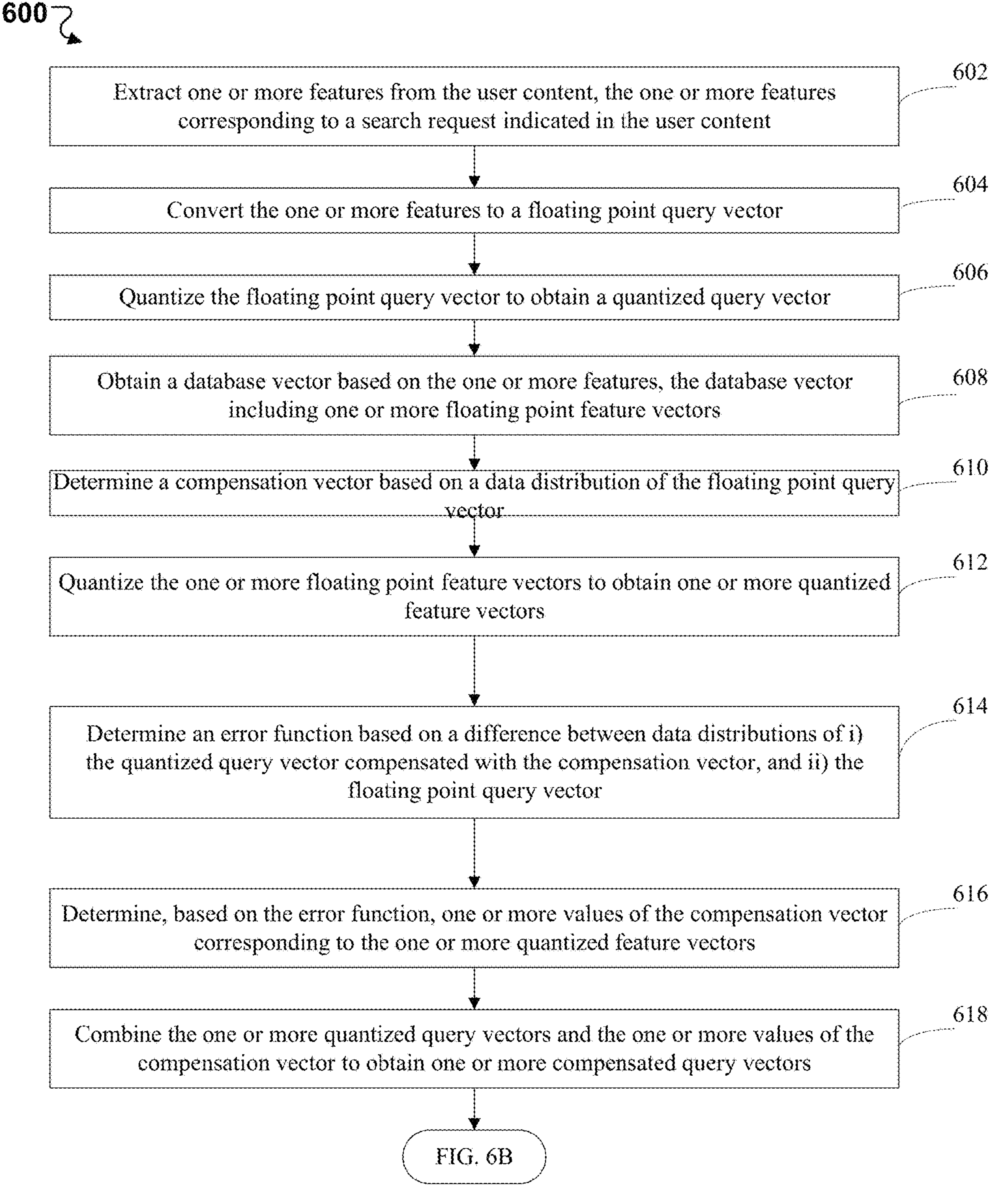
FIGS. 6A-6B illustrate a flowchart of an example method, according to some implementations.
Figure 6B:
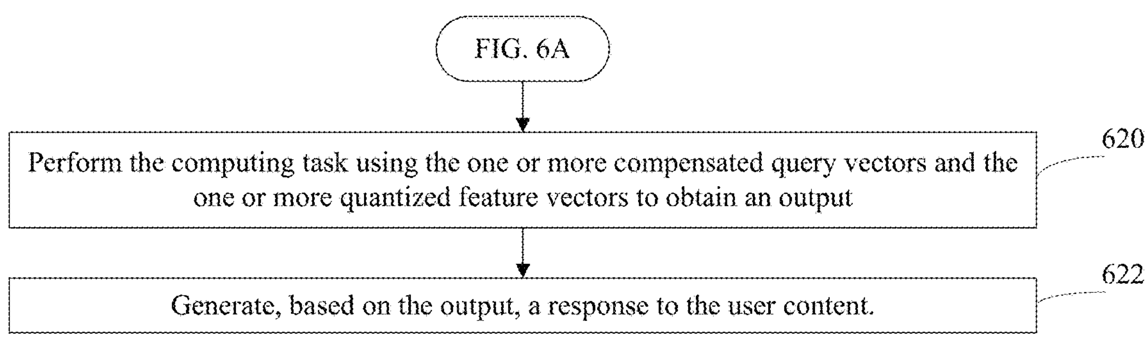

FIGS. 6A and 6B together illustrate a flowchart of an example method 600 for performing a computing task based on a user content, according to some implementations. The method 600 can be performed, e.g., in part or in whole by the host controller 122, the processor 113, or the memory 116 of the system 100. One or more operations of the method 600 can be similar to operations of algorithm 400.

At 602, one or more features are extracted from the user content. The one or more features can correspond to a search request indicated in the user content.

At 604, the one or more features are converted to a floating point query vector, which can be similar to the query vector $X_q$.

At 606, the floating point query vector is quantized to obtain a quantized query vector, which can be similar to the quantized query vector $$X'_q.$$

At 608, a database vector is obtained based on the one or more features. The database vector, which can be similar to feature data set D, can include one or more floating point feature vectors.

At 610, a compensation vector based on a data distribution of the floating point query vector is obtained.

At 612, the one or more floating point feature vectors are quantized to obtain one or more quantized feature vectors, which can be similar to the quantized feature vectors D'.

At 614, an error function is determined based on a difference between data distributions of i) the quantized query vector compensated with the compensation vector, and ii) the floating point query vector. The error function can be similar to the error function $f$.

At 616, based on the error function, one or more values of the compensation vector corresponding to the one or more quantized feature vectors are determined. The determination of the one or more values of the compensation vector can be similar to the determination of $\varepsilon_i$.

At 618, the one or more quantized query vectors and the one or more values of the compensation vector are combined to obtain one or more compensated query vectors.

At 620, the computing task is performed using the one or more compensated query vectors and the one or more quantized feature vectors to obtain an output.

At 622, a response to the user content is generated based on the output. The response can indicate, e.g., a result to the search request.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more of these. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for performing a computing task based on a user content, the method comprising:
  - extracting one or more features from the user content, the one or more features corresponding to a search request indicated in the user content;
  - converting the one or more features to a floating point query vector;
  - quantizing the floating point query vector to obtain a quantized query vector;
  - obtaining a database vector based on the one or more features, the database vector comprising one or more floating point feature vectors;
  - determining a compensation vector based on a data distribution of the floating point query vector;
  - quantizing the one or more floating point feature vectors to obtain one or more quantized feature vectors;
  - determining an error function based on a difference between data distributions of i) the quantized query vector compensated with the compensation vector, and ii) the floating point query vector;
  - determining, based on the error function, one or more values of the compensation vector corresponding to the one or more quantized feature vectors, wherein the one or more values of the compensation vector are determined such that a difference in magnitude between the quantized query vector compensated with the compensation vector and each of the one or more quantized feature vectors is below a known threshold value;
  - combining the one or more quantized query vectors and the one or more values of the compensation vector to obtain one or more compensated query vectors; and
  - performing the computing task using the one or more compensated query vectors and the one or more quantized feature vectors to obtain an output.

2. The method of claim 1, wherein the computing task comprises performing at least one of a multiply-and-accumulate operation, general matrix multiplication (GeMM), fully connected layer computing, or k-nearest neighbors computing.

3. The method of claim 1, wherein the computing task comprises computing a plurality of vector distances.

4. The method of claim 3, wherein the plurality of vector distances comprises at least one of: a plurality of cosine similarity distances, a plurality of Euclidean distances, or a plurality of Hamming distances.

5. The method of claim 3, further comprising generating a response to the user content based on the output, wherein generating the response comprises sorting the plurality of vector distances in a descending order or an ascending order.

6. The method of claim 1, wherein the user content comprises at least one of:
  - graphical information, textual information, geographical information, or temporal information.

7. The method of claim 1, further comprising receiving the user content from at least one of: a text-based search engine, a graph-based search engine, a brute force search engine, or a behavior-based content recommendation system.

8. The method of claim 1, wherein performing the computing task comprises performing the computing task using an in-memory computing (IMC) circuit, and wherein the IMC circuit comprises a plurality of memory cells comprising at least one of NAND flash cells, NOR flash cells, phase change memory (PCM), Magnetoresistive random-access memory (MRAM), Ferroelectirc random-access memory (FeRAM), or Spin-Transfer-Torque random-access memory (STT-RAM).

9. A computing system comprising:

one or more processors; and a computing circuit coupled to the one or more processors, wherein the one or more processors are configured to execute instructions to perform operations comprising:

extracting one or more features from user content, the one or more features corresponding to a search request indicated in the user content;

converting the one or more features to a floating point query vector;

quantizing the floating point query vector to obtain a quantized query vector;

obtaining a database vector based on the one or more features, the database vector comprising one or more floating point feature vectors;

determining a compensation vector based on a data distribution of the floating point query vector;

quantizing the one or more floating point feature vectors to obtain one or more quantized feature vectors;

determining an error function based on a difference between data distributions of i) the quantized query vector compensated with the compensation vector, and ii) the floating point query vector;

determining, based on the error function, one or more values of the compensation vector corresponding to the one or more quantized feature vectors, wherein the one or more values of the compensation vector are determined such that a difference in magnitude between the quantized query vector compensated with the compensation vector and each of the one or more quantized feature vectors is below a known threshold value;

combining the one or more quantized query vectors and the one or more values of the compensation vector to obtain one or more compensated query vectors; and performing, by the computing circuit, a computing task using the one or more compensated query vectors and the one or more quantized feature vectors to obtain an output.

10. The computing system of claim 9, wherein the computing task comprises performing at least one of: a multiply-and-accumulate operation, general matrix multiplication (GeMM), fully connected layer computing, or k-nearest neighbors computing.

11. The computing system of claim 10, wherein the computing task comprises computing a plurality of vector distances, and wherein the plurality of vector distances comprises at least one of: a plurality of cosine similarity distances, a plurality of Euclidean distances, or a plurality of Hamming distances.

12. The computing system of claim 10, the operations further comprising generating a response to the user content based on the output, wherein generating the response comprises sorting the plurality of vector distances in a descending order or an ascending order.

13. The computing system of claim 9, wherein the user content comprises at least one of: graphical information, textual information, geographical information, or temporal information.

14. The computing system of claim 9, the operations further comprising receiving the user content from at least one of: a text-based search engine, a graph-based search engine, a brute force search engine, or a recommendation system.

15. The computing system of claim 9, wherein the computing circuit comprises an in-memory computing (IMC) circuit, wherein the IMC circuit comprises a plurality of memory cells comprising at least one of: NAND flash cells, NOR flash cells, phase change memory (PCM), Magnetoresistive random-access memory (MRAM), Ferroelectirc random-access memory (FeRAM), or Spin-Transfer-Torque random-access memory (STT-RAM).

16. A non-transitory computer-readable medium storing program instructions that, when executed, cause one or more processors to perform operations comprising:

extracting one or more features from user content, the one or more features corresponding to a search request indicated in the user content;

converting the one or more features to a floating point query vector;

quantizing the floating point query vector to obtain a quantized query vector;

obtaining a database vector based on the one or more features, the database vector comprising one or more floating point feature vectors;

determining a compensation vector based on a data distribution of the floating point query vector;

quantizing the one or more floating point feature vectors to obtain one or more quantized feature vectors;

determining an error function based on a difference between data distributions of i) the quantized query vector compensated with the compensation vector, and ii) the floating point query vector;

determining, based on the error function, one or more values of the compensation vector corresponding to the one or more quantized feature vectors, wherein the one or more values of the compensation vector are determined such that a difference in magnitude between the quantized query vector compensated with the compensation vector and each of the one or more quantized feature vectors is below a known threshold value;

combining the one or more quantized query vectors and the one or more values of the compensation vector to obtain one or more compensated query vectors; and performing a computing task using the one or more compensated query vectors and the one or more quantized feature vectors to obtain an output.

17. The non-transitory computer-readable medium of claim 16, wherein the computing task comprises computing a plurality of vector distances.

* * * * *